Patented Jan. 9, 1951

2,537,791

UNITED STATES PATENT OFFICE 2,537,791

METHOD FOR PRODUCTION OF HYDRAZINE AND/OR HYDRAZINE HYDRATE

Morton Schwarcz, Chicago, Ill., assignor to The Edwal Laboratories, Inc., Chicago, Ill., a corporation of Illinois No Drawing. Application August 17, 1946, Serial No. 691,397

14 Claims. (Cl. 23—190)

My invention relates to the production of hydrazine and hydrazine hydrate, the latter being produced preferably in relatively high concentration.

While various methods have heretofore been known or proposed for the production of hydrazine or of highly concentrated hydrazine hydrate, all of them, to my knowledge, have been characterized by certain disadvantages which have militated against their more widespread adoption.

Generally speaking, relatively concentrated hydrazine hydrate is usually obtained through the preliminary preparation of dilute hydrazine hydrate, formed by reacting a hydrazine salt with an alkali such as caustic soda, the resulting dilute hydrazine hydrate then being repeatedly fractionated through the utilization of efficient stills until a product of the desired concentration is obtained. The losses from decomposition and the formation of large volumes of forerunnings, namely, low concentration hydrazine hydrate solutions, render such procedure undesirable.

The concentration of dilute hydrazine hydrate by means of azeotropic distillation with xylene, benzene, toluene, and the like, has also been proposed. Since hydrazine co-distills with xylene and water, only a low yield of concentrated hydrazine hydrate is obtained. Benzene and toluene are even less efficient than xylene in such process.

Still another method which has been suggested for the preparation of relatively concentrated hydrazine hydrate involves the preliminary production of hydrazine hydrate of 6% to 8% concentration, the latter then being continuously fractionated through a three-stage still, the low percentage solutions being recycled through the first column. While this process is fairly efficient, the investment in equipment is considerable.

It has also been proposed to react hydrazine hydrochloride with sodium methylate, in methanol, to obtain a concentrated hydrazine-methanol solution. The preparation of hydrazine hydrate therefrom involves the separation of the hydrazine from the methanol followed by the addition of water to the hydrazine. This process is inconvenient, expensive to operate, and is unsuited for the commercial production of hydrazine hydrate.

Known methods for the preparation of hydrazine usually depend upon dehydrating the concentrated hydrazine hydrate, this being usually accomplished by refluxing hydrazine hydrate in a reducing atmosphere with calcium oxide or barium oxide, over a long period of time, and subjecting the reaction mixture to distillation. Such methods produce low yields of hydrazine due to decomposition, incomplete dehydration, and the inherent difficulty of distilling hydrazine from the large quantity of calcium hydroxide or barium hydroxide necessarily used in the process.

In accordance with my invention, hydrazine or hydrazine hydrate of desired concentration are obtained in excellent yields by a simple and inexpensive process which may be readily practiced on either a small or large scale production basis. In general, in accordance with my invention, a hydrazine salt is admixed with an amine which boils at a temperature higher than hydrazine or hydrazine hydrate, as the case may be. The resulating mixture is then distilled, only a single distillation being required, and the resulting distillate is collected. Where hydrazine is desired, the reaction mixture of the hydrazine salt and the amine should be anhydrous or substantially free from water. Where hydrazine hydrate is desired, water is added to the reaction mixture prior to distillation. The water may be present in the reactants utilized or may be added extraneously in the requisite amounts. The concentration of the hydrazine hydrate which is produced in the process may be controlled by the amount of water which is incorporated into the reaction mixture prior to distillation. It will be understood, of course, that hydrazine hydrate of desired concentration may also be produced by the addition of water to the anhydrous hydrazine resulting from the distillation.

The following examples are illustrative of the practice of my invention. It will be understood that various changes and modifications may be made therein, for example, in the reactants utilized, in the proportions thereof, temperature and time of treatments and the like without in any way departing from the spirit of the invention in the light of the guiding principles which are disclosed herein:

Example 1.—Preparation of hdrazine

To 218 grams of anhydrous triethylenetetramine in a three-necked flask, fitted with an efficient stirrer and arranged for distillation, there was added 130 grams of hydrazine sulfate. After the reaction mixture has been stirred for one to two hours at 60–70 degrees C., the temperature was increased to 120–130 degrees C. and anhydrous hydrazine was collected in the distillate.

Example 2.—Preparation of 85.5 percent hydrazine hydrate

To 200 grams of diethylene glycol and 80 grams of triethylenetetramine, said reactants containing a few percent of water, in a three-necked flask equipped with a stirrer and arranged for distillation, there was added 136 grams of hydrazine sulfate. After the reaction mixture had been stirred for one hour, a vacuum was applied and the reaction vessel heated to 140–170 degrees C. The distillate resulting from the operation was hydrazine hydrate of 85.5 per cent concentration.

*Example 3.—Preparation of 67 percent hydrazine hydrate*

360 grams of triethanolamine, containing several percent of water, was stirred for one hour at 40 degrees C. with 130 grams of hydrazine sulfate. Upon heating the reaction mixture at 200 degrees C. under a reduced pressure, 67 percent hydrazine hydrate was obtained in the distillate.

*Example 4.—Preparation of 100 percent hydrazine hydrate*

A mixture of 260 grams of hydrazine sulfate, 240 grams of triethylenetetramine, and 20 grams of water was stirred in a three-necked flask at 60 degrees C. for one hour. At the end of that period, the flask was arranged for distillation and the following listed fractions removed:

| Fraction | Boiling Range at 70 mm. mercury | Weight, grams | Concentration, calculated as Hydrazine Hydrate |
|---|---|---|---|
|  | °C. |  | Per cent |
| 1 | 59–60 | 19.5 | 112 |
| 2 | 61–62 | 29 | 114 |
| 3 | 61–64 | 15 | 108 |
| 4 | 61–67 | 12 | 102 |

The amine may be recovered and used in succeeding reactions.

While, in the foregoing examples, I have utilized hydrazine sulfate in the reaction, any other hydrazine salt may be employed as, for example, hydrazine monohydrochloride, hydrazine dihydrochloride, hydrazine hydrobromides, hydrazine acetate and the like. Hydrazine sulfate is, however, particularly preferred.

The amines which are utilized in accordance with my present invention may be selected from a large group, it being necessary only that they boil at a temperature higher than hydrazine or hydrazine hydrate, as the case may be, so that a separation may take place in the distillation. Thus, where hydrazine is being prepared, the amine should have a boiling point higher than hydrazine; and where a particular concentration of hydrazine hydrate is being prepared, the amine should have a boiling point higher than that of said particular concentration of hydrazine hydrate. Such amines may be of aliphatic, cyclo aliphatic, aromatic, hydro aromatic or aralipathic character, normal or iso, mono or poly, representative examples of which are propylamine, isopropylamine, butylamine, octylamine, decylamine, dodecylamine, cetylamine, monoethanolamine, diethanolamine, triethanolamine, propanolamine, isopropanolamine, butanolamine, cyclohexylamine, amylamine, benzylamine, hydroxyethyl ethylenediamine, diethylenetriamine, triethylenetetramine, and higher homologues thereof, mixtures of any two or more of the aforesaid or other amines, and the like. Of particular utility are the alkylene polyamines and, of this group, diethylenetriamine and triethylenetetramine are especially satisfactory.

It will be noted that, in Example 2, I have disclosed the utilization of diethylene glycol. Since the reaction mixtures tend to become somewhat viscous, I find it highly advantageous, in many instances, to reduce the viscosity of the reaction mixtures prior to distillation to render such mixtures easier to handle in the process. While any agent may be used which is effective to reduce viscosity and which is compatible and will not react in the process with the hydrazine salt and the amine, I find it advantageous to utilize, as viscosity reducers, glycols (including polyglycols) and lower molecular weight glycol ethers such as ethylene glycol, propylene glycol, diethylene glycol, triethylene glycol, ethylene glycol monobutyl ether, diethylene glycol monomethyl ether, diethylene glycol monoethyl ether, diethylene glycol monobutyl ether, and the like.

I have also found it advantageous to use an excess over stoichiometric proportions of the amine and I prefer, particularly, in most instances, to utilize from about 1¼ mols to about 3½ mols of the amine for each mol of hydrazine salt. The use of an excess over stoichiometric proportions of the amine serves, among other things, to produce a reaction mixture having a viscosity lower than that which would result if only stoichiometric proportions of the hydrazine salt and the amine were utilized.

The distillation of the reaction mixture may be carried out, if desired, at atmospheric pressure. Since the hydrazine is susceptible to oxidation with the resultant possibility of explosions occurring, I prefer to carry out the distillation under non-oxidizing conditions. To this end, the distillation may be effected at atmospheric pressure in a reducing atmosphere or at a reduced pressure or, alternatively, both a reduced pressure and a reducing atmosphere may, if desired, be utilized.

In view of the foregoing disclosure, it will be seen that my invention enables the production of hydrazine or hydrazine hydrate to be carried out in a simple manner and with inexpensive equipment. In general, the yields are higher than those obtained by various of the known methods. Since only one distillation is required, the resulting short processing time reduces the possibility of losses due to decomposition. Where hydrazine hydrate is the desired product, the process can be adjusted so as to produce the same in any desired concentration including, of course, a 100% product. In the case of hydrazine, a relatively rare commodity, my invention makes possible its production cheaply from easily obtainable hydrazine salts without the necessity of long, tedious and expensive dehydration procedures.

While I have described my invention in detail, it will be understood that the same is not to be limited except as is set forth in the claims.

What I claim as new and desire to protect by Letters Patent of the United States is:

1. In a method for the production of a member selected from the group consisting of hydrazine and hydrazine hydrate, the steps which comprise providing a mixture containing a hydrazine salt and an organic amine which boils at a temperature higher than the member selected, distilling said mixture, and collecting the resulting distillate.

2. In a method for the production of a member selected from the group consisting of hydrazine and hydrazine hydrate, the steps which comprise providing a mixture containing hydrazine sulfate and an alkylene polyamine which boils at a temperature higher than the member selected, distilling said mixture, and collecting the resulting distillate.

3. In a method for the production of hydrazine hydrate, the steps which comprise providing a mixture containing water, a hydrazine salt, and an organic amine which boils at a temperature higher than hydrazine or hydrazine hydrate, distilling said mixture, and collecting the resulting distillate.

4. In a method for the production of hydrazine hydrate, the steps which comprise providing a mixture containing water, hydrazine sulfate and an alkylene polyamine which boils at a temperature higher than hydrazine hydrate, distilling said mixture, and collecting the resulting distillate.

5. In a method for the production of hydrazine, the steps which comprise providing a mixture containing a hydrazine salt and an organic amine which boils at a temperature higher than hydrazine, to provide a mixture substantially free of water, distilling said mixture, and collecting the resulting distillate.

6. In a method for the production of hydrazine, the steps which comprise providing a mixture containing hydrazine sulfate and an alkylene polyamine which boils at a temperature higher than hydrazine, to provide a mixture substantially free of water, distilling said mixture under non-oxidizing conditions, and collecting the resulting distillate.

7. In a method for the production of hydrazine, the steps which comprise providing a substantially anhydrous mixture containing a hydrazine salt and an organic amine which boils at a temperature higher than hydrazine, said amine being present in excess over stoichiometric proportions, distilling said mixture, and collecting the resulting distillate.

8. In a method for the production of hydrazine, the steps which comprise providing a substantially anhydrous mixture containing hydrazine sulfate and an alkylene polyamine which boils at a temperature higher than hydrazine, said polyamine being present in a ratio of from about 1¼ mols to about 3½ mols of said polyamine for each mol of hydrazine sulfate, distilling said mixture under non-oxidizing conditions, and collecting the resulting distillate.

9. In a method for the production of a member selected from the group consisting of hydrazine and hydrazine hydrate, the steps which comprise providing a mixture containing a hydrazine salt, an organic amine which boils at a temperature high than the member selected, and a viscosity-reducing agent, distilling said mixture, and collecting the resulting distillate.

10. In a method for the production of a member selected from the group consisting of hydrazine and hydrazine hydrate, the steps which comprise providing a mixture containing hydrazine sulfate, an alkylene polyamine which boils at a temperature higher than the member selected, and a viscosity-reducing agent selected from the group consisting of glycols and lower molecular weight glycol ethers, distilling said mixture under non-oxidizing conditions, and collecting the resulting distillate.

11. In a method for the production of hydrazine hydrate, the steps which comprise providing a mixture containing water, hydrazine sulfate, and diethylenetriamine, said diethylenetriamine being present in excess over stoichiometric proportions, distilling said mixture under non-oxidizing conditions, and collecting the resulting distillate.

12. In a method for the production of hydrazine, the steps which comprise providing a substantially anhydrous mixture containing hydrazine sulfate and diethylenetriamine, said diethylenetriamine being present in a ratio of from about 1¼ mols to about 3½ mols of said diethylenetriamine for each mol of hydrazine sulfate, distilling said mixture under non-oxidizing conditions, and collecting the resulting distillate.

13. In a method for the production of hydrazine hydrate, the steps which comprise providing a mixture containing water, hydrazine sulfate, and triethylenetetramine, said triethylenetetramine being present in excess of stoichiometric proportions, distilling said mixture under non-oxidizing conditions, and collecting the resulting distillate.

14. In a method for the production of hydrazine, the steps which comprise providing a substantially anhydrous mixture containing hydrazine sulfate and triethylenetetramine, said triethylenetetramine being present in a ratio of from about 1¼ mols to about 3½ mols of said triethylenetetramine for each mol of hydrazine sulfate, distilling said mixture under non-oxidizing conditions, and collecting the resulting distillate.

MORTON SCHWARCZ.

REFERENCES CITED

The following references are of record in the file of this patent:

"Handbook of Chemistry and Physics," by C. D. Hodgman, 27th ed., pp. 456–457. Published by Chem. Rubber Publishing Co., Cleveland, Ohio.

"Hackh's Chemical Dictionary," 3rd ed., page 43. The Blakiston Co., Philadelphia.

Mellor: Inorganic and Theoretical Chemistry, vol. 8, page 310, Longmans, Green & Co., N. Y., pub.